United States Patent [19]
You et al.

[11] Patent Number: 5,581,361
[45] Date of Patent: Dec. 3, 1996

[54] INTERLEAVING/DEINTERLEAVING APPARATUS FOR A DIGITAL VIDEO CASSETTE RECORDER AND THE METHOD THEREOF

[75] Inventors: Byung K. You; Il K. Seung, both of Seoul, Rep. of Korea

[73] Assignee: Goldstar Co., Ltd., Seoul, Rep. of Korea

[21] Appl. No.: 148,498

[22] Filed: Nov. 8, 1993

[30] Foreign Application Priority Data

| Nov. 6, 1992 | [KR] | Rep. of Korea | 92-20834 |
| Feb. 16, 1993 | [KR] | Rep. of Korea | 93-2115 |
| Jun. 4, 1993 | [KR] | Rep. of Korea | 93-10116 |
| Jun. 4, 1993 | [KR] | Rep. of Korea | 93-10117 |

[51] Int. Cl.$^6$ .................... H04N 5/76; G11B 5/09
[52] U.S. Cl. .................... 386/46; 360/48
[58] Field of Search .................... 358/335, 342, 358/310; 360/32, 33.1, 48; 348/395, 603, 384

[56] References Cited

U.S. PATENT DOCUMENTS

| 4,811,123 | 7/1989 | Yoshinaka | 360/26 |
| 5,289,322 | 2/1994 | Higashida et al. | 360/32 |
| 5,291,282 | 3/1994 | Nakagawa et al. | 348/384 |

FOREIGN PATENT DOCUMENTS

| 0203773 | 12/1986 | European Pat. Off. . |
| 0267029 | 5/1988 | European Pat. Off. . |
| 0434837 | 7/1991 | European Pat. Off. . |
| 0508606 | 10/1992 | European Pat. Off. . |
| 2194851 | 3/1988 | United Kingdom . |

OTHER PUBLICATIONS

Patent Abstracts of Japan, vol. 9, No. 35 (E–296) 14 Feb. 1985.
Patent Abstract of Japan, vol. 10, No. 38 (P–428) 14 Feb. 1986.
Hawthorne et al, "Error–Correction Scheme for Storage System", IEEE Journal on Selected Areas in Communications, vol. 10, No. 1, Jan. 1992, pp. 267–275.
Watkinsin, J., The Art of Digital Video, Error Correction, pp. 317–323.
Watkinsin, J., The Art of Digital Video, The D–1 Color Difference DVTR Format, pp. 391–393.

*Primary Examiner*—Thai Q. Tran
*Assistant Examiner*—Robert Chevalier
*Attorney, Agent, or Firm*—Jacobson, Price, Holman & Stern, PLLC

[57] ABSTRACT

The interleaving/deinterleaving region of compressed image data is restrictively determined in accordance with a predetermined maximum speed, and interleaving/deinterleaving is performed within the restricted interleaving/deinterleaving region. Various burst and random errors can be effectively processed and corrected, especially in variable speed play since the compressed image data is stored in and read out from a memory with a different format. In recording and reproduction, the compressed image data is scanned per data segment in zigzag form and the data sequence of the input data segment is changed, resulting in interleaving being performed with data continuity maintained. Error correction capability is improved by performing outer and inner coding with respect to the interleaved data.

8 Claims, 22 Drawing Sheets

FIG. 2A
| INDEX | 0 | 1 | 2 | 3 | 4 | 5 | 6 | 7 | 8 | 356 | 357 | 358 | 359 |
|---|---|---|---|---|---|---|---|---|---|---|---|---|---|
| SYMBOL TYPE | $CB_0$ | $Y_0$ | $CR_0$ | $Y_1$ | $CB_2$ | $Y_2$ | $CR_2$ | $Y_3$ | $CR_4$ | $CB_{178}$ | $Y_{178}$ | $CB_{179}$ | $Y_{179}$ |
FIG. 2B
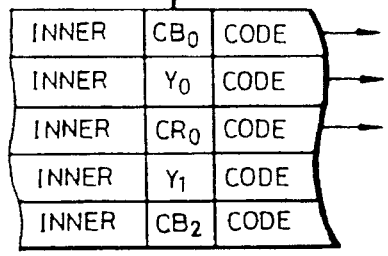
FIG. 2C
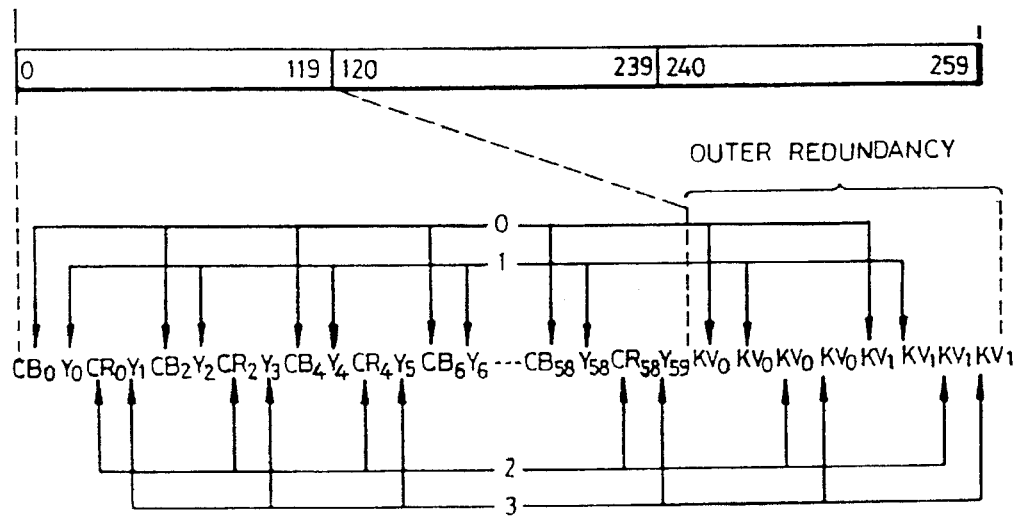
FIG. 2D
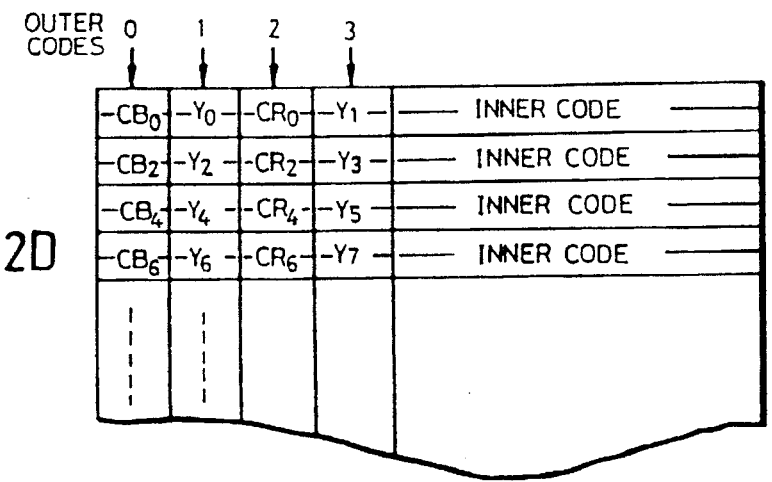

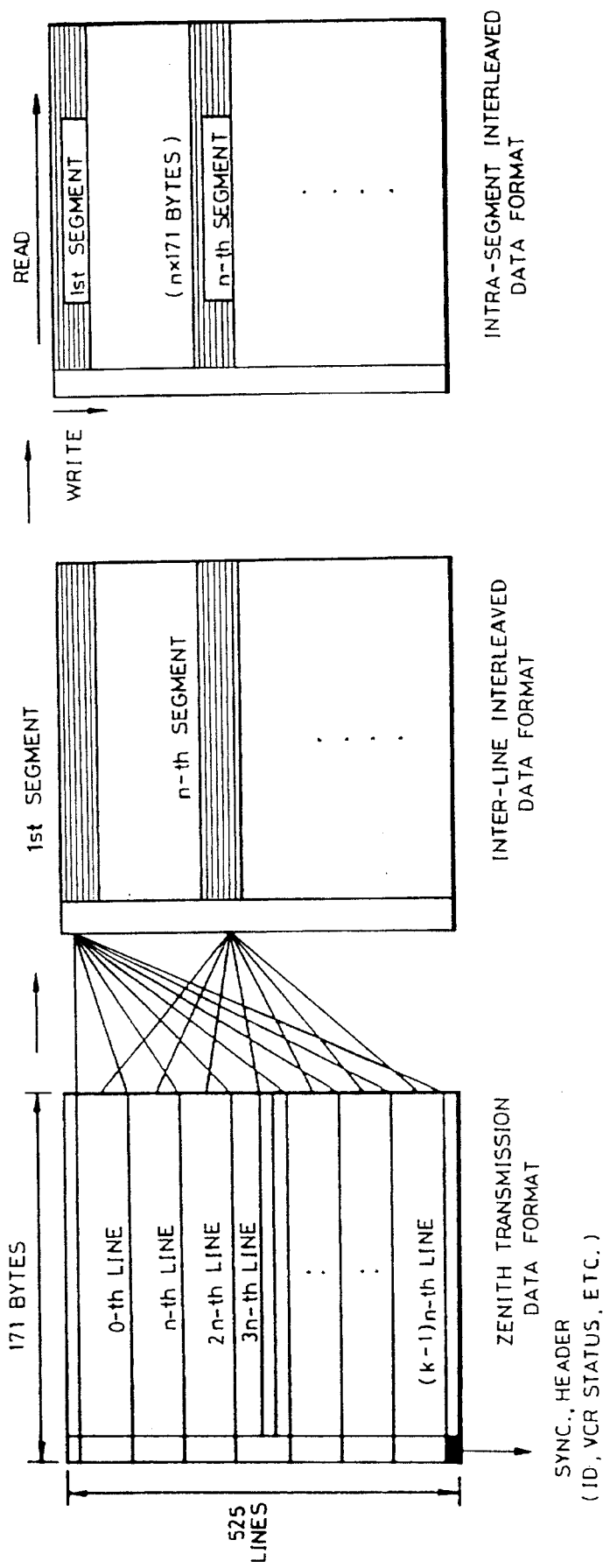

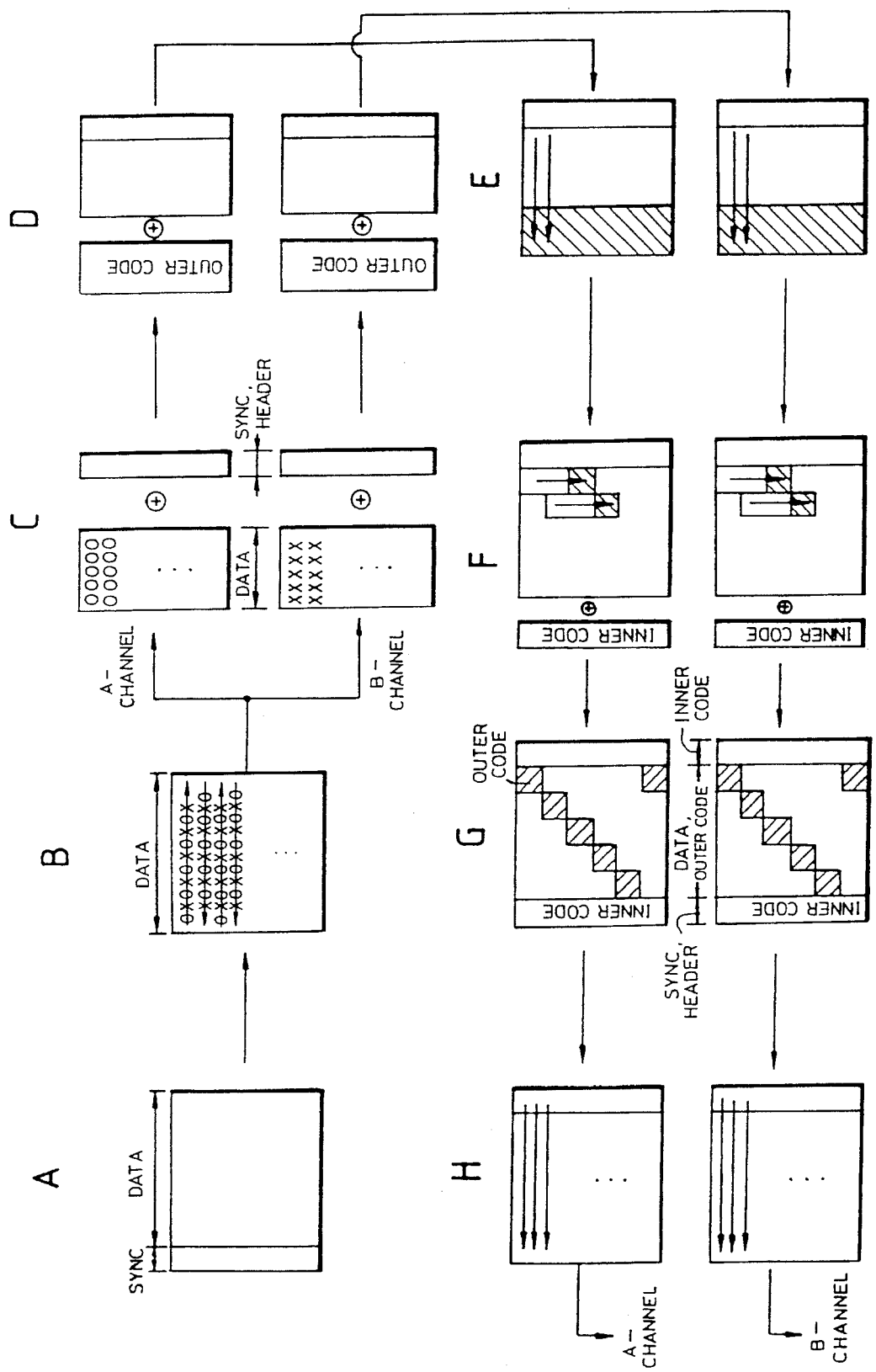

F I G. 12
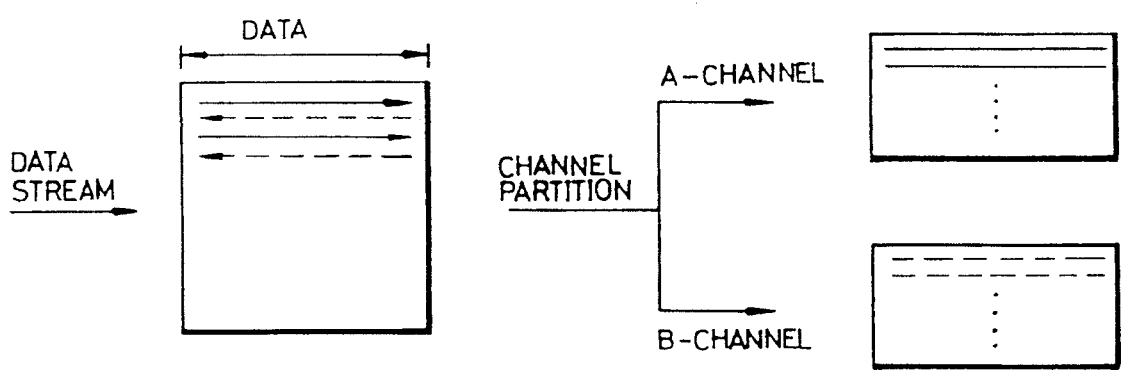

F I G.16
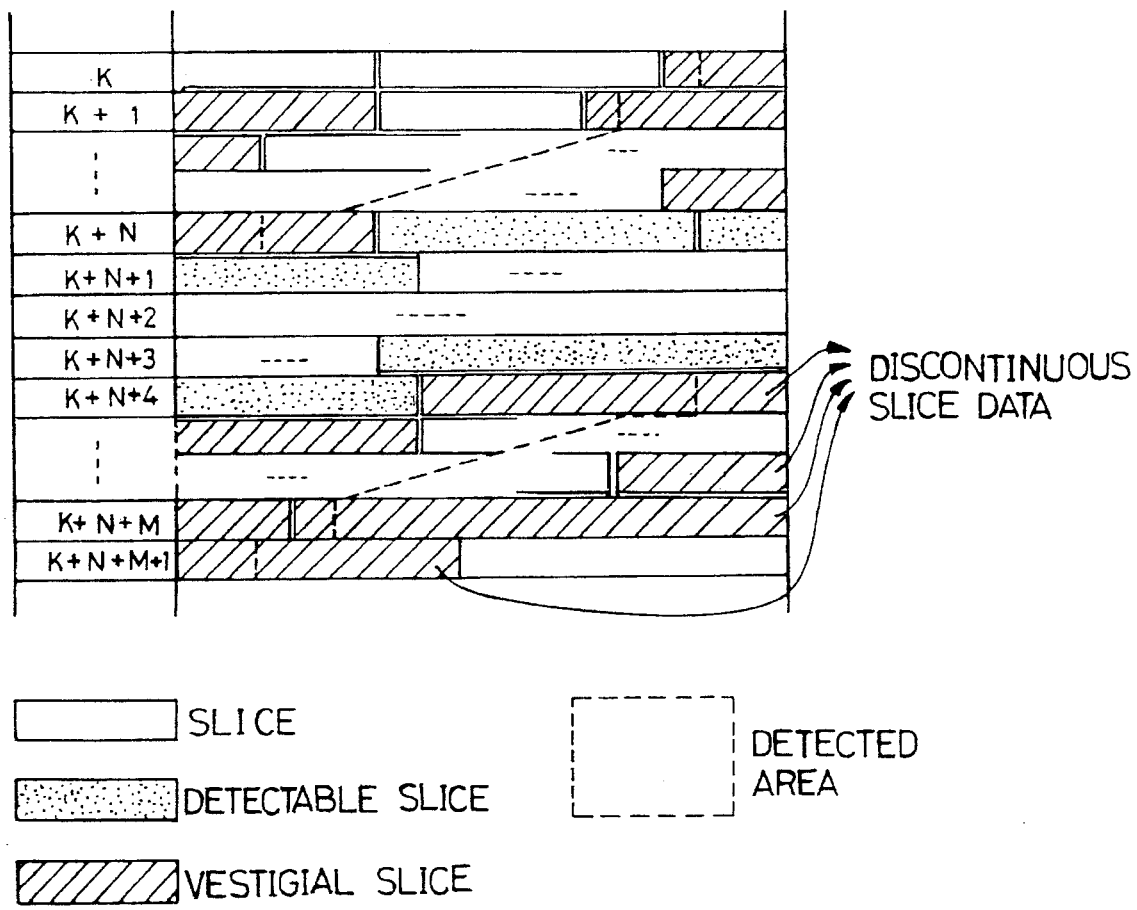

- $A_n, B_n, \cdots X_n$ : DATA SYMBOL
- $(\text{------})_n$ : DATA BLOCK FROM n-th DATA LINE (SEGMENT)

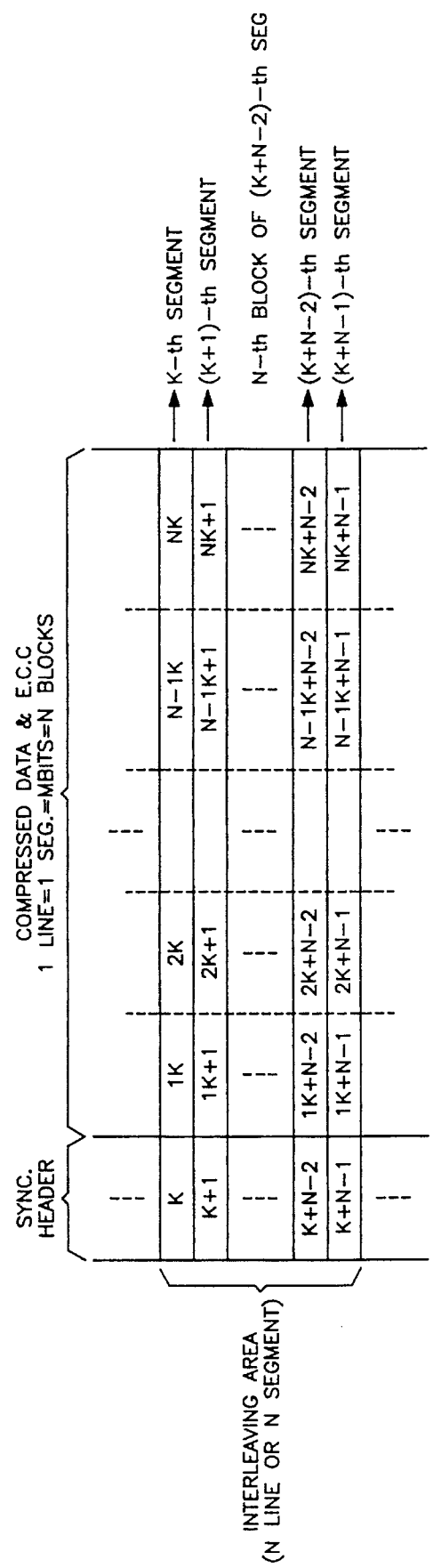

INTERLEAVING/DEINTERLEAVING APPARATUS FOR A DIGITAL VIDEO CASSETTE RECORDER AND THE METHOD THEREOF

BACKGROUND OF THE INVENTION

1. Field of the Invention

The present invention relates to a digital video cassette recorder (VCR), and more particularly to an apparatus for and a method of interleaving/deinterleaving for a digital VCR which can effectively correct errors occurring in recording or reproduction of compressed data and improve error correction capability, especially in variable speed reproduction.

2. Description of the Prior Art

The errors occurring in recording and reproduction with a digital VCR may be classified as random errors and burst errors. Random errors independently occur in digital signal lines due to additive noise during signal processing, and burst error is successive error occurring with respect to a bit stream of transmission data under the influence of tape condition, and so on. Burst error can be corrected by being replaced with random errors through an interleaving/deinterleaving process.

A conventional interleaving apparatus for a digital VCR, as shown in FIG. 1, includes outer coder 1 for performing outer coding with respect to an input compressed data stream and successively outputting the data stream with an outer code symbol added thereto, first sector array memory 2 for successively storing the data outputted from outer coder 1, and inner coder 3 for reading the data stored in first sector array memory 2 in an order different from that in storing the data to first sector array memory 2, performing inner coding, outputting and recording the data with inner code symbol added thereto on a tape via a head. The interleaving apparatus is also provided with inner decoder 4 for decoding only data having the inner code symbol among the data reproduced from the tape, detecting errors in the data and performing interleaving with respect to such detected errors, second sector array memory 5 for distributively storing the interleaved data from inner decoder 4, and outer decoder 6 for reading out data from second sector array memory 5 in an order different from that in writing the data and performing decoding with respect to data having the outer code symbol to correct the errors.

In the conventional interleaving apparatus constructed as above, when the compressed data stream as shown in FIG. 2A is inputted, outer coder 1 performs outer coding in a vertical direction with respect to a series of symbols of the input data as shown in FIG. 2B and outputs data having the outer code symbol. Then, a redundancy is added to the data having the outer code symbol as shown in FIG. 2C and the redundancy-added data is stored in first sector array memory 2 in the order shown in FIG. 2D.

Inner coder 3 reads out the data from first sector array memory 2 in an order different from that in storing the data and performs interleaving to add the inner code symbol to the data. Accordingly, the order of the data is changed, being different from that of the input data, causing a burst error to be replaced by random errors. The data stream interleaved as described above is then inner-coded by inner coder 3, with the result that strong error correction coding (ECC) is performed.

Inner decoder 4 decodes the data having the inner code symbol among the data having the inner and outer code symbols reproduced from the tape and detects and corrects the errors. That is, in correcting the errors, inner decoder 4 performs interleaving with respect to the errors which exist beyond its capability and distributively stores the interleaved data still having errors in second sector array memory 5. Outer decoder 6 performs outer decoding with respect to the data stored in second sector array memory 5 to correct the remaining errors, and thereby various kinds of errors occurring in reproduction in a digital VCR can be corrected and prevented.

The conventional apparatus as described above thus provides a strong capability to correct various errors occurring in reproduction of data and is suitable for use in a digital VCR for professional purposes.

However, in a home digital VCR, such an elaborate apparatus for strong error correction cannot be used due to a limitation of recording frequency bandwidth and high costs.

Also, in high speed play such as a picture search mode, the VCR head, as shown in FIGS. 4A to 4C, passes across various tape tracks and the head trace region in a track, as well as the size of a sector array memory in the conventional apparatus, is inversely proportional to the degree of high speed.

Practically, the VCR head in high speed play has a nonlinear trace as shown in FIG. 4C, and this causes the maximum interleaving region for ECC to be further restricted in comparison to the linear head trace. Also, in high speed play, the head continually passes the track portion of the same position due to the restricted interleaving region, and the image data of the same picture portion is extracted. Accordingly, in order to obtain the image data of other picture portions, data allocation for rearranging the data recording position is required.

Further, when a signal is recorded on a tape track by the conventional apparatus as shown in FIG. 10A, a redundancy is added to the signal, utilizing a two-dimensional Reed-Solomon code for correcting various kinds of burst and random errors. Thus, in normal reproduction of the signal, the decoding array is fully occupied with information data and the 2-dimensional Reed-Solomon decoding can be performed.

However, in a special reproduction such as a high speed play, only a portion of the track can be traced, and thus the decoding array is partially occupied with information data and only one-dimensional error decoding can be used, causing the confidence in correcting the errors to deteriorate.

Meanwhile, the data segments reproduced by the conventional apparatus are classified into complete segments and incomplete segments, and the data segment is composed of slices which are the variable unit in which the image data and other information are compressed and compacted. Accordingly, as shown in FIG. 15, several slices may exist in the K-th segment while a slice may exist over two segments as shown in (k+1)-th segment.

Such slices may be performed with variable length coding (VLC) or compressed at different rates in encoding a high quality image or a normal image. Thus, the lengths of the respective compressed data streams may appear to be different from one another, even though the respective image information of the same amount are compressed. Accordingly, in order to perfectly perform the variable length decoding (VLD) in a decoder, a complete bit stream should be reproduced in the unit of slice.

According to the conventional apparatus, however, groups of complete and incomplete segments are placed in the detected area as shown in FIG. 16 when the reproduced data stream has been deinterleaved in variable speed play. If the slices, being the unit of data compaction, exist over incomplete segments excluding the group of complete segments, such slices in the incomplete segments will be of no use, inviting data loss.

SUMMARY OF THE INVENTION

It is an object of the present invention to provide an interleaving/deinterleaving apparatus for a digital VCR and the method thereof which can effectively correct various kinds of burst and random errors in recording/reproduction of compressed data.

It is another object of the present invention to provide an interleaving/deinterleaving apparatus for a digital VCR and the method thereof which makes it possible to effect maximum interleaving/deinterleaving within a predetermined high speed by determining an interleaving/deinterleaving region in accordance with the predetermined high speed and by performing interleaving/deinterleaving within the determined interleaving/deinterleaving region.

In order to achieve the above objects, there is provided an interleaving/deinterleaving apparatus for a digital VCR which comprises:

interleaving/deinterleaving control means for restrictively determining an interleaving/deinterleaving region in accordance with a predetermined maximum speed in recording/ reproduction of compressed image data;

memory means for storing and reading out said compressed image data in a specific format under the control of said interleaving/deinterleaving control means; and means for performing interleaving/deinterleaving with respect to said compressed in age data provided from said memory means.

Also, in order to achieve the above objects, there is provided an interleaving/deinterleaving method for a digital VCR which comprises the steps of:

dividing an input compressed data stream into a synchronizing signal and data and formatting the data in the unit of segment;

reading the formatted data segments in zigzag form and storing the read data segments in a memory mapper;

dividing each of the data segments stored in the memory mapper into n segment blocks and successively writing the segment blocks in a data field with shifting each of the segment blocks for one vertical size of the data segment; and performing inter-symbol interleaving with respect to data symbols in the segment blocks by classifying the data symbols and sectioning the classified data symbols in line.

BRIEF DESCRIPTION OF THE DRAWINGS

The above objects and other advantages of the present invention will become more apparent by describing the preferred embodiments thereof with reference to the accompanying drawings, in which:

FIGS. 2A to 2D are yields explaining the interleaving operation by means of the apparatus of FIG. 1.

FIGS. 5A to 5C are views explaining the interleaving operation by means of the apparatus of FIG. 3.

FIG. 11 is a view explaining a data formatting process in recording in accordance with the present invention.

FIG. 12 illustrates the state of channel partition resulting from zigzag scanning of the compressed data in the data formatting process in FIG. 12.

FIG. 16 shows an example of groups of complete and incomplete segments in a detected area.

FIG. 18 is a view explaining a synchronizing signal and data divided from the compressed data stream by the apparatus of FIG. 13.

DETAILED DESCRIPTION OF THE PREFERRED EMBODIMENTS

Figure 1:
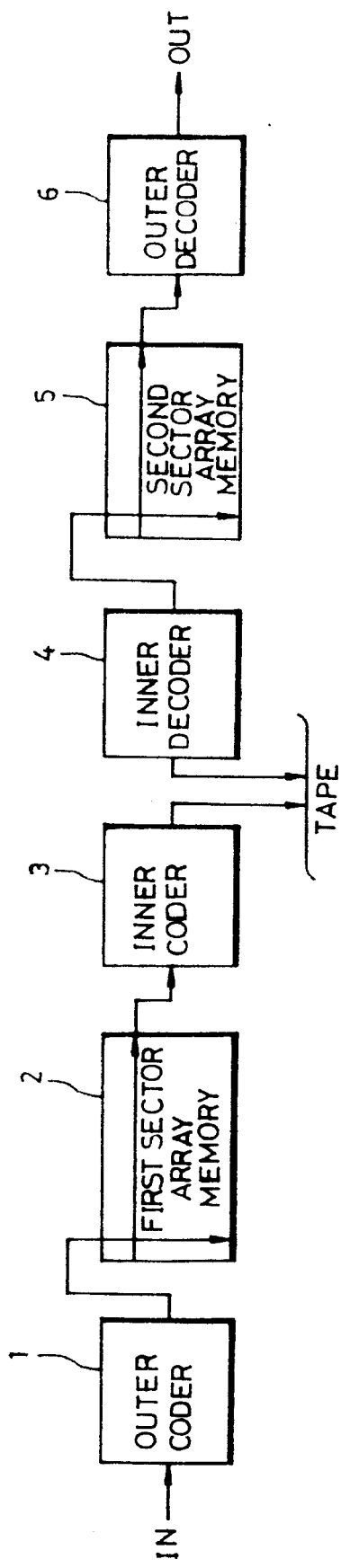
FIG. 1 is a block diagram of the conventional interleaving apparatus for a digital VCR.
Figure 3:
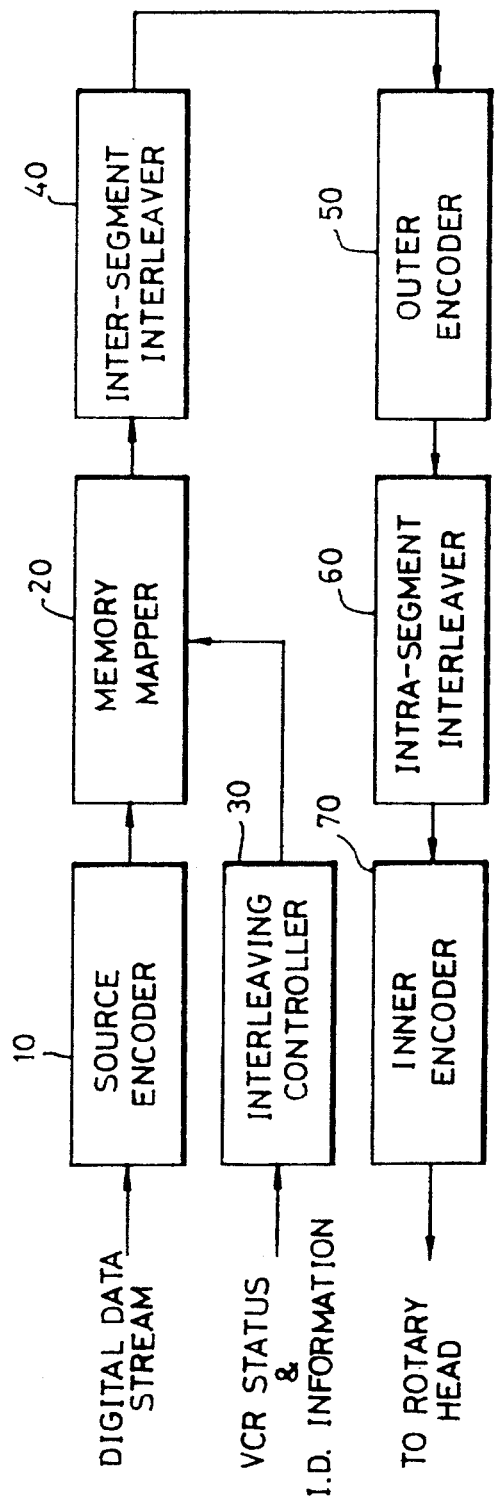
FIG. 3 is a block diagram of an embodiment of the interleaving/deinterleaving apparatus according to the present invention.

FIG. 3 shows an embodiment of the interleaving/deinterleaving apparatus for a digital VCR according to the present invention. The apparatus comprises source encoder 10 for encoding an input image data stream, memory mapper 20 for storing and reading out the image data stream encoded by source encoder 10 in the unit of segment, interleaving controller 30 for restricting an interleaving region in accordance with a header information in line with a predetermined maximum speed, inter-segment interleaver 40 for performing inter-segment interleaving with respect to segments of the image data stream provided from memory mapper 20, outer encoder 50 for performing outer encoding with respect to the image data stream from inter-segment interleaver 40, intra-segment interleaver 60 for performing intra-segment interleaving with respect to the segments of the image data stream from outer encoder 50, and inner encoder 70 for performing inner encoding with respect to the image data stream from intra-segment interleaver 60.

Figure 4A:
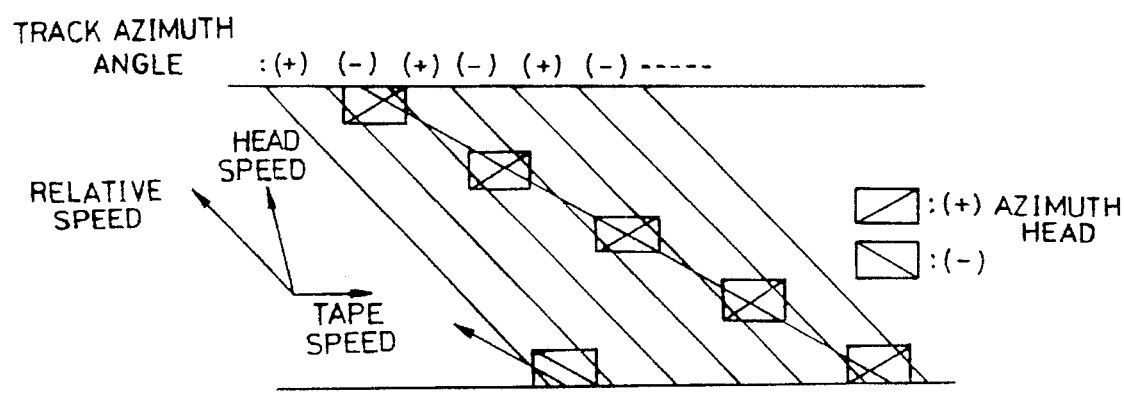
FIGS. 4A to 4C show the respective states of head trace on tape, track contact area and non-linear track trace in a high speed search mode.
Figure 4B:
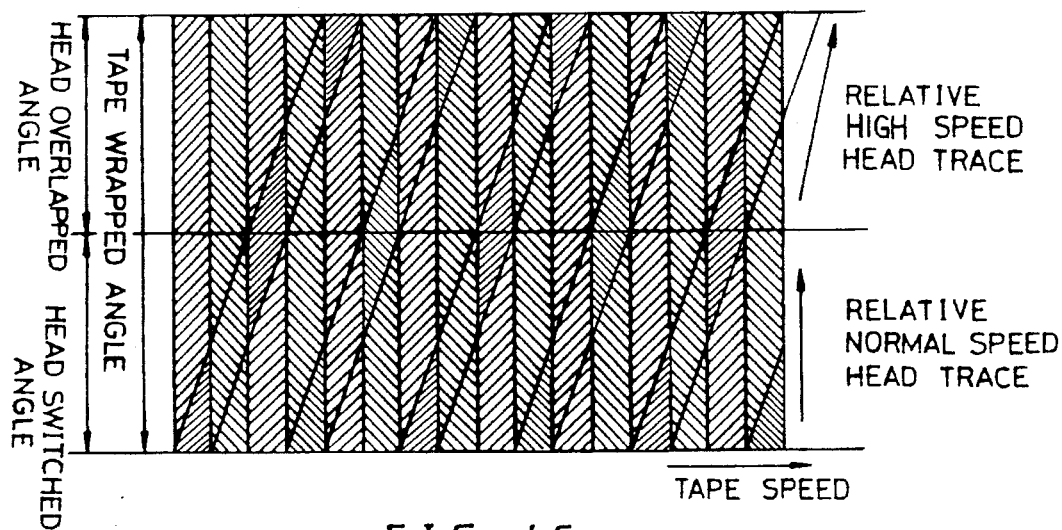
Figure 4C:
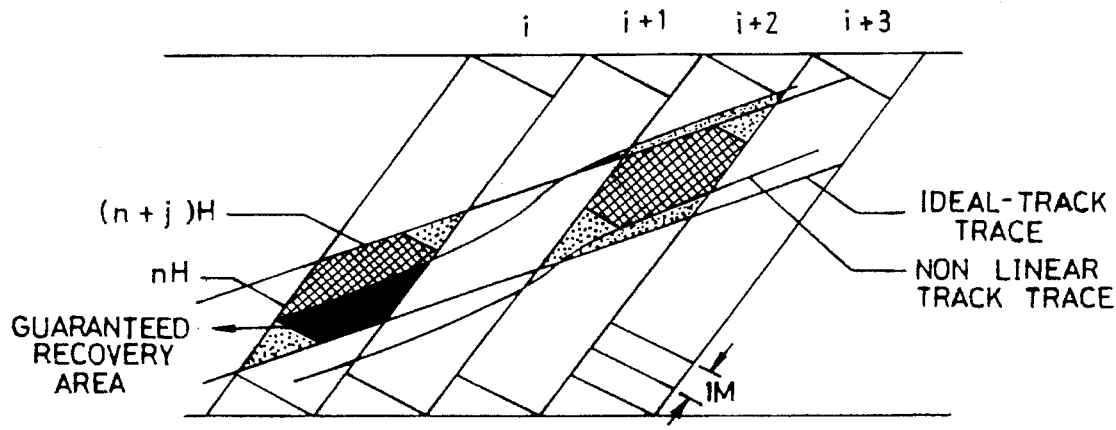

A video head may pass through many more tracks as shown in FIG. 4A in high speed play such as in picture search mode than in normal speed play as shown in FIG. 4B and thus substantially much data in the track cannot be read out. Accordingly, errors occur and propagate due to the unread data so that even a powerful ECC may not function.

Thus, the maximum interleaving region should be smaller than the area of the track trace covered by the head in the maximum speed mode of the VCR, wherein the region is obtained by the following expression $$S < \frac{1}{N-1} \cdot TD$$

where S ($0 \leq S \leq 1$) is an interleaving region, N is the maximum speed in reproduction, and TD ($0 \leq TD \leq 1$) is a track deviation degree.

In this embodiment, after source encoder 10 encodes an input digital data stream and provides the data stream as shown in FIG. 5A, memory mapper 20 divides the data stream in the unit of segment as shown in FIG. 5B and stores the divided data stream. At this time, interleaving controller 30 provides to memory mapper 20 a control signal for determining an interleaving region in accordance with a VCR status signal and ID information in line with the above expression and performing interleaving within the determined region, thereby preventing the reduction of interleaving effect in normal and high speed reproduction.

At this point, TD shows a track deviation degree of the head. If TD=1, the center of the head is in accord with that of the track and thus tracking is completely performed. If TD<1, the track is deviating from the head. That is, in variable speed play, the head passes through many tracks so that the region in which a head can read information data for one track should be within the range of $0 \leq TD \leq 1$.

Inter-segment interleaver 40 performs inter-segment interleaving and provides the interleaved data to outer encoder 50, where the inter-segment interleaving can be achieved by interleaving data between segments in the process of reading out data from memory mapper 20 in the unit of segment. Outer encoder 50 performs outer encoding with respect to the data from inter-segment interleaver 40 and provides the encoded data to intra-segment interleaver 60. Intra-segment interleaver 60 performs intra-segment interleaving, i.e., interleaves data inside of segments as shown in FIG. 5C. Thus, burst errors in the data stream can be replaced by random errors and the data from intra-segment interleaver 60 are ECC-processed by inner encoder 70 and then written to the tape through the head.

Figure 6:
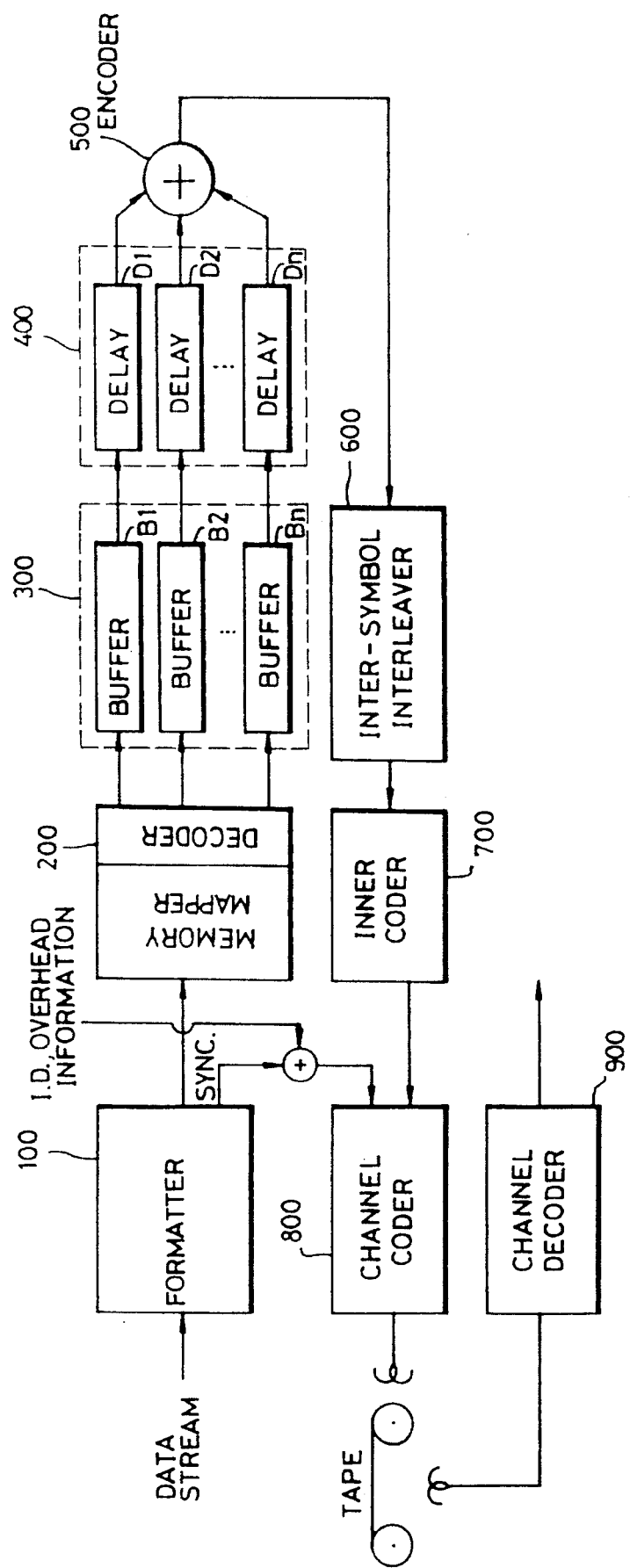
FIG. 6 is a block diagram of another embodiment of the interleaving/deinterleaving apparatus according to the present invention.

Referring to FIG. 6, the interleaving/deinterleaving apparatus for a digital VCR according to another embodiment of the invention comprises a formatter 100 for performing the recording format with respect to an input digital data stream in accordance with an ID information and an overhead information, a memory mapper and decoder 200 for keeping the continuity between the segments and performing interleaving with respect to the output of formatter 10 in accordance with the characteristics of the VCR and dividing the data stream, buffering section 300 for buffering the outputs from memory mapper and decoder 200, delay section 400 for successively delaying the data buffered from buffering section 300 for a predetermined time, encoder 500 for encoding the data delayed by delay section 400, inter-symbol interleaver 600 for performing inter-symbol interleaving with respect to the output of encoder 500, inner encoder 700 for performing inner encoding with respect to the interleaved data from inter-symbol interleaver 600, channel coder 800 for connecting the data stream to tape channel, and channel decoder 900 for decoding the data reproduced from the tape.

Figure 7A:
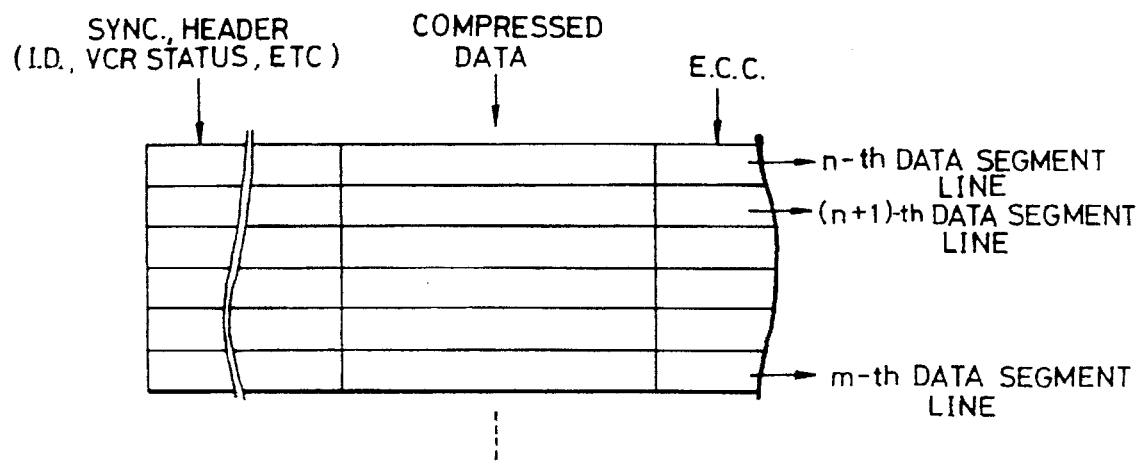
FIGS. 7A to 7C show the respective states of a recording data format of a digital VCR, an interleaving process and interleaved data.
Figure 7B:
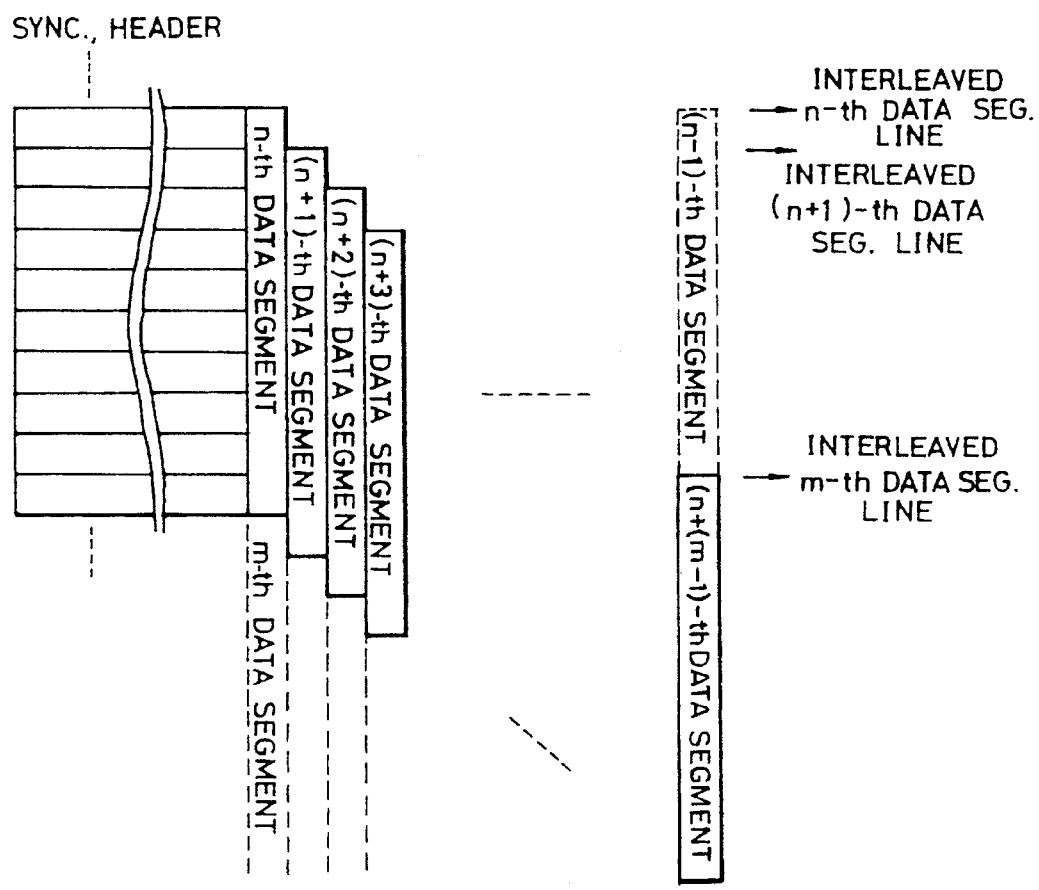

In the above embodiment, formatter 100 receives a digital data stream and performs VCR recording format with respect to the respective data segment lines (compressed data or error correction (E.C.C.)) except for the preceding header portion as shown in FIG. 7A and then provides the formatted data stream to memory mapper and decoder 200. Memory mapper and decoder 200 performs interleaving with respect to the provided data stream in accordance with the characteristics of the VCR, keeping the continuity between the segments. The interleaved data pass through respective buffers B1 to Bn in buffering section 300 and respective delays D1, to Dn in delay section 400 and then are constructed as shown in FIG. 7B.

Figure 7C:
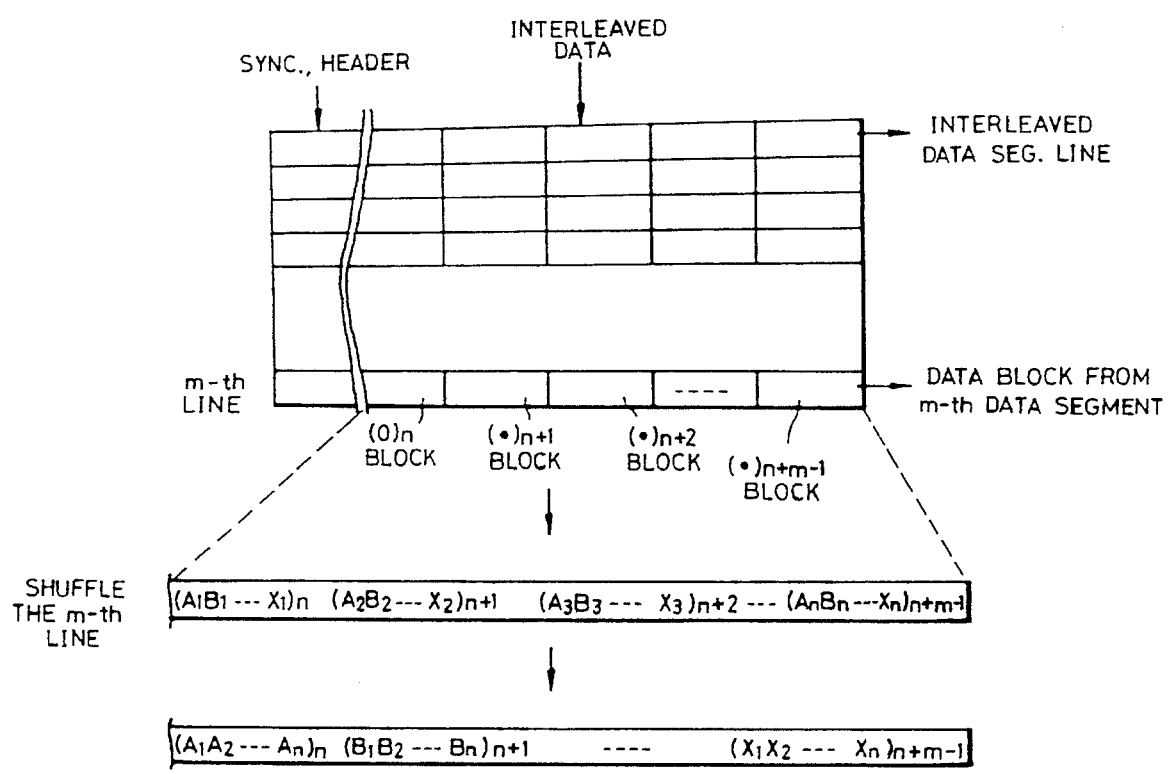

When the interleaved data are encoded through encoder 500 and applied to inter-symbol interleaver 600, the data are shuffled completely as shown in FIG. 7C and are inner-encoded by inner encoder 700 so as to be provided to channel coder 800. Channel coder 800 records the data provided from inner encoder 700 to the tape by connecting the channel of the data stream to that of the tape, thereby completing the interleaving process.

When the data recorded on the tape are made to be reproduced, channel decoder 900 decodes the reproduced data and detects and corrects the errors. Thereafter, the detected data are performed by the aforementioned interleaving process reversely, i.e., performed by deinterleaving process.

In variable speed reproduction play, the interleaving region is determined in accordance with the predetermined maximum speed. The segments in the neighboring areas within the determined region are successively formatted as shown in FIG. 7A, 7B and 7C. Accordingly, discontinuity between segments does not occur and thus the interleaving effect is not reduced at any speed lower than maximum speed though the head of VCR may have nonlinear traces.

Figure 8:
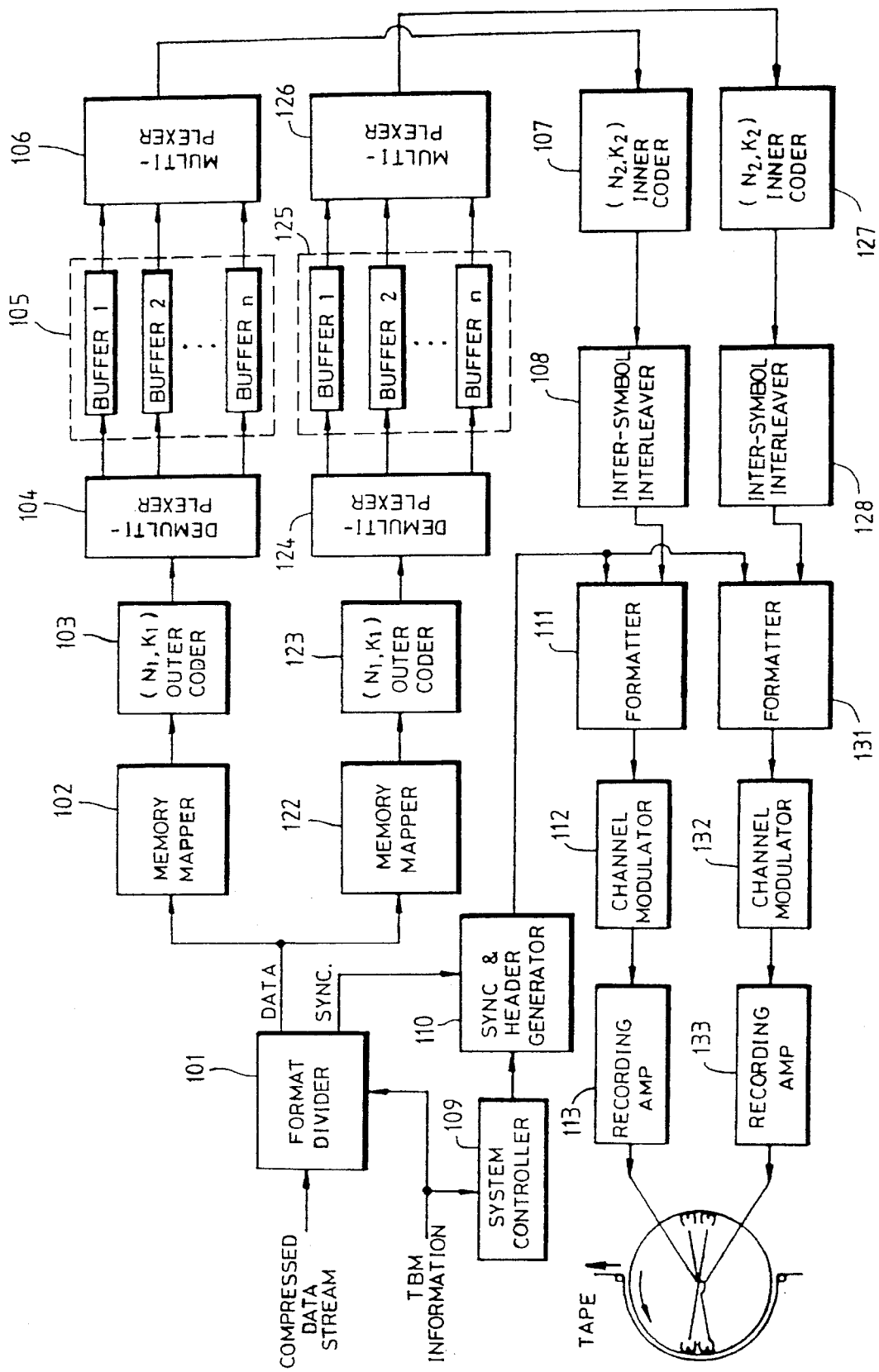
FIG. 8 is a block diagram of still another embodiment of the interleaving apparatus according to the present invention.

FIG. 8 shows still another embodiment of the interleaving apparatus according to the present invention. The apparatus comprises format divider 101 for dividing an input compressed data stream into a synchronizing signal and data and formatting the divided synchronizing signal and data, memory mapper 102 for reading and storing data segments of the divided data in zigzag form, outer coder 103 for performing outer coding (i.e., Reed-Solomon coding) with respect to the data N1 and K1 stored in memory mapper 102 and providing the data to which an outer code symbol is added, demultiplexer 104 for demultiplexing the segments provided from outer coder 103 and temporarily storing the data segments in n buffers 105 arranged in a vertical direction, multiplexer 106 for multiplexing the data segments from buffers 105 so as to provide the multiplexed data, inner coder 107 for performing inner coding with respect to the data from multiplexer 106 and providing data having an inner code symbol added thereto, inter-symbol interleaver 108 for performing inter-symbol interleaving with respect to the data provided from inner encoder 107, synchronizing and header signal generator 110 for receiving the synchronizing signal from format divider 101 and providing a header signal corresponding to the synchronizing signal along with the synchronizing signal, system controller 109 for controlling format divider 101 and synchronizing and header signal generator 110 in accordance with an input TBM signal, formatter 111 for formatting the synchronizing and the header signals form synchronizing and header signal generator 110 and the symbol code data from inter-symbol interleaver 108, channel modulator 112 for modulazing the data from formatter 111 and providing the modulated signal as a tape recording signal, and recording amplifier 113 for amplifying the data from channel modulator 112 to make the data have an appropriate level and recording the amplified data to the tape.

Figure 9:
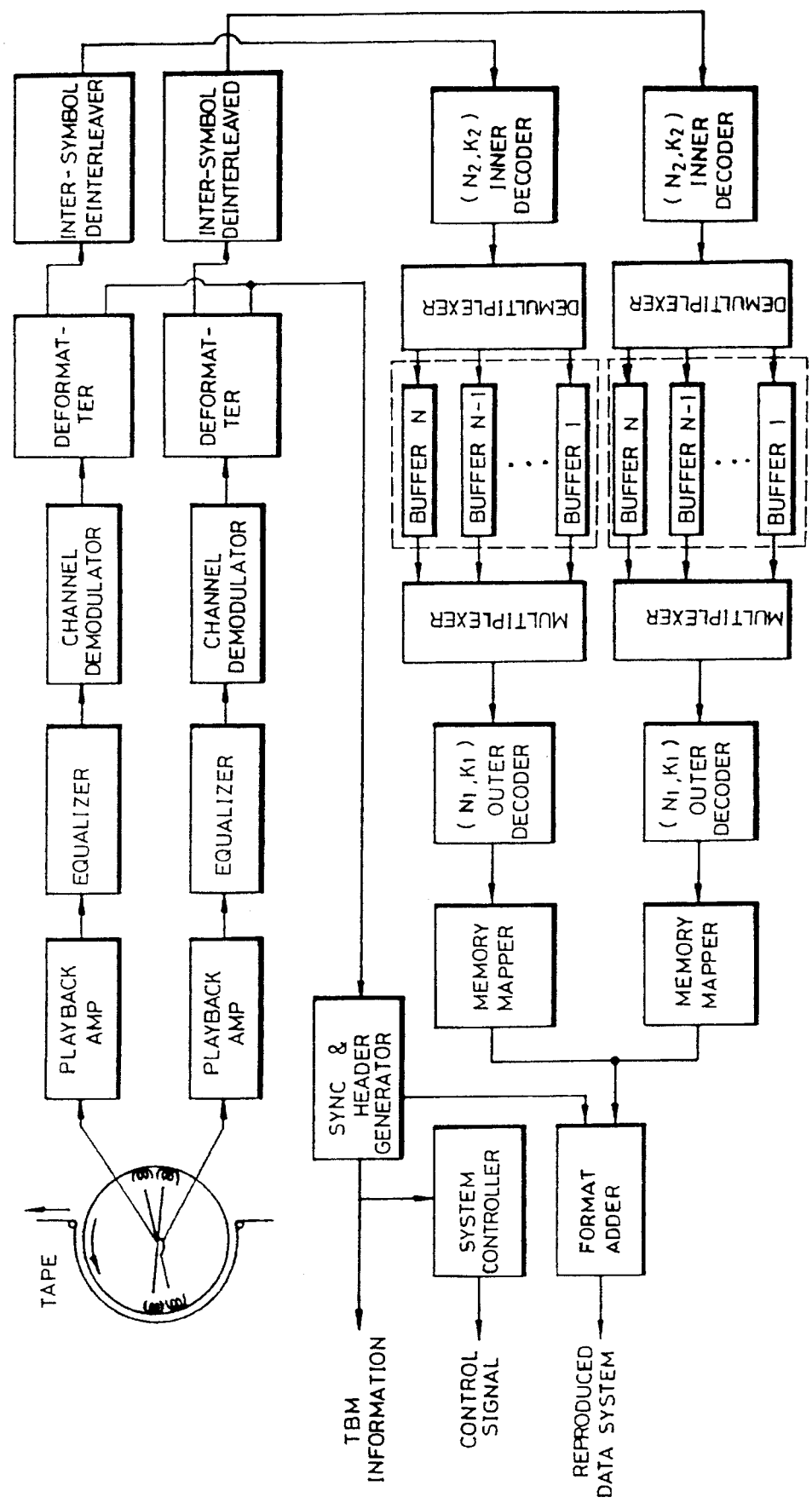
FIG. 9 is a block diagram of still another embodiment of the deinterleaving apparatus according to the present invention.
Figure 10A:
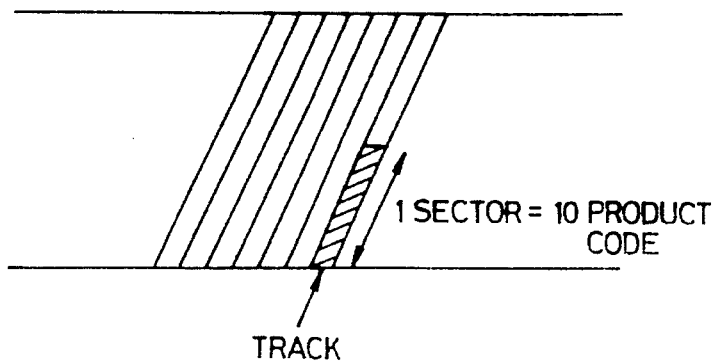
FIG. 10A illustrates the state of a tape track traced in normal play.
Figure 10B:
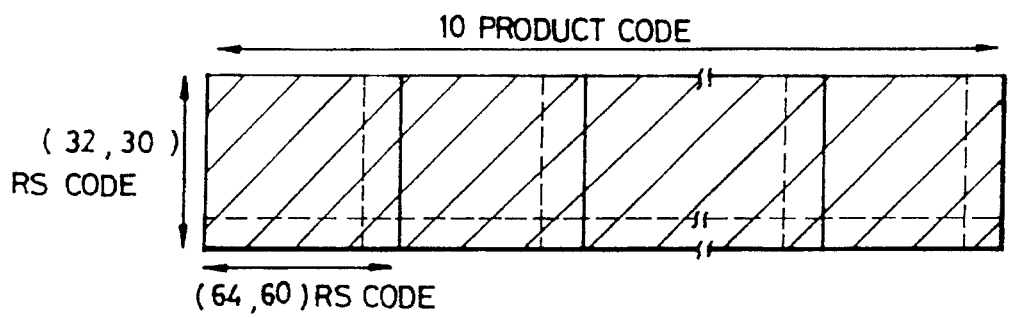
FIG. 10B is a view explaining a decoding array occupied in full by information data.
Figure 10C:
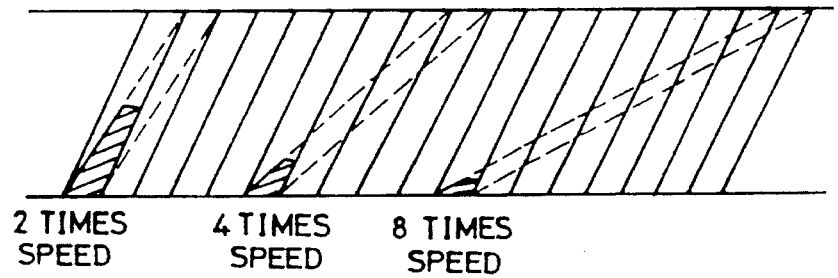
FIG. 10C illustrates the state of a tape track traced in variable speed play.
Figure 10D:
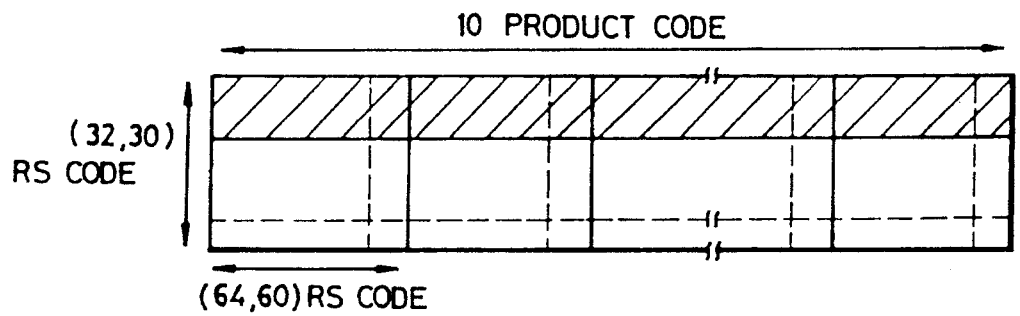
FIG. 10D is a view explaining a decoding array partially occupied by information data.

For the reproduced data, the deinterleaving process is performed by the deinterleaving apparatus in which the above interleaving apparatus is reversely constructed as shown in FIG. 9 and the description thereof will be omitted.

Meanwhile, it will be understood that the data divided by format divider 101 enter in two directions so as to be divided into two channels and the description for only one channel will follow.

Format divider 101 receives a compressed data stream and divides the data stream into a synchronizing signal and compressed data as shogun in FIG. 11A and then performs formatting. The divided data are scanned in zigzag form and stored in the unit of segment in memory mapper 102 as shown in FIG. 11B, being divided in to A channel data and B channel data as shown in FIG. 11C so as to be separately processed when the data is read out therefrom.

Multiplexers 106 and 126 multiplex the interleaved data and provide the multiplexed data. Inner encoder 107 and 127 add the Reed-Solomon code of ($N_2$, $K_2$) to the data provided from multiplexers 106 and 126 and perform inner encoding as shown in FIG. 11G so as to provide the encoded data to inter-symbol interleavers 108 and 128. Inter-symbol interleavers 108 and 128 perform inter-symbol interleaving with respect to the symbol data, thereby correcting the random errors.

Thus, from synchronizing and header signal generator 110, formatters 111 and 131 receive a synchronizing signal divided form format divider 101 and a header signal corresponding to the synchronizing signal under the control of system controller 109 and perform formatting with respect to the received data along with the data from inter-symbol interleavers 108 and 128 as shown in FIG. 11H so as to provide the formatted data to channel modulators 112 and 132. Channel modulators 112 and 132 perform channel modulation with respect to the provided data. The modulated data enter recording amplifiers 113 and 133 to be amplified and then are recorded on the tape.

In reproduction, errors can be prevented by reversely reproducing the data formatted and recorded as described above by way of the circuit of FIG. 9.

Figure 13:
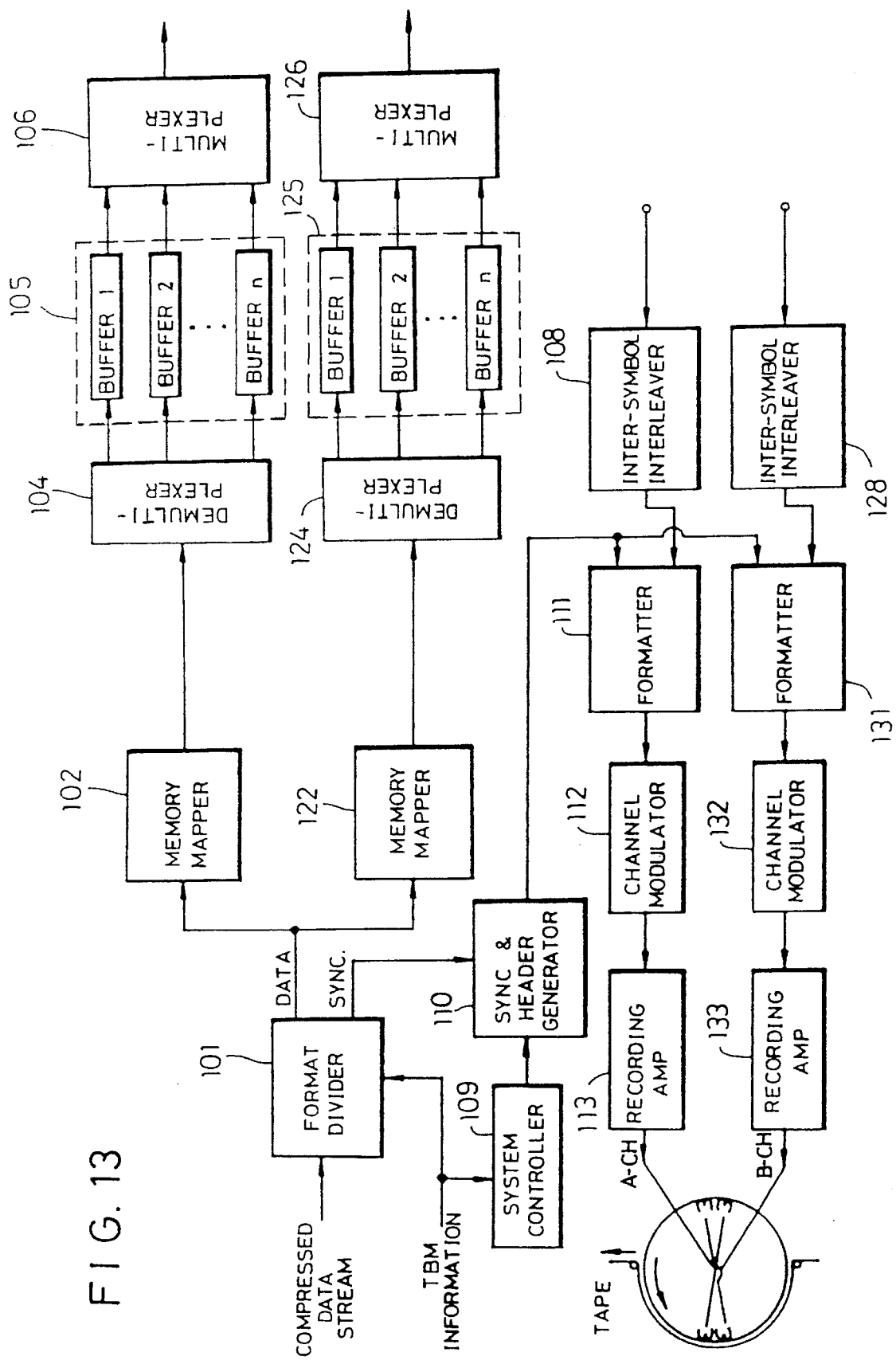
FIG. 13 is a block diagram of still another embodiment of the interleaving apparatus according to the present invention.

FIG. 13 shows still another embodiment of the interleaving apparatus according to the present invention. The apparatus comprises a format divider 101 for dividing an input compressed data stream into a synchronizing signal and data and formatting the divided synchronizing signal and the data, memory mapper 102 for reading out and storing in zigzag form the data divided by format divider 101, demultiplexer 104 for dividing the data in a segment stored in memory mapper 102 into n blocks and demultiplexing each segment block and storing the demultiplexed data segment in n buffers 105, multiplexer 106 for multiplexing the data temporarily stored in buffer 105, inter-symbol interleaver 108 for performing interleaving with respect to the symbol data multiplexed through multiplexer 106 in order to divide the symbol data along the same line per block, synchronizing and header signal generator 110 for receiving the synchronizing signal from format divider 101 and providing a header signal corresponding to the synchronizing signal along with the synchronizing signal, a system controller 109 for controlling format divider 104 and synchronizing and header signal generator 110 in accordance with an input TBM signal, formatter 111 for formatting the synchronizing and the header signals from synchronizing and header signal generator 110 and the symbol data from inter-symbol interleaver 108, channel modulator 112 for modulating the data from formatter 111 so as to make the modulated data suitable for recording on the tape, and recording amplifier 113 for amplifying the data from channel modulator 112 up to an appropriate level and recording the amplified data to the tape.

It will be understood that the data divided by format divider 101 enter in two directions so as to divide the data into two channels and the description for only one channel will follow.

Figure 14:
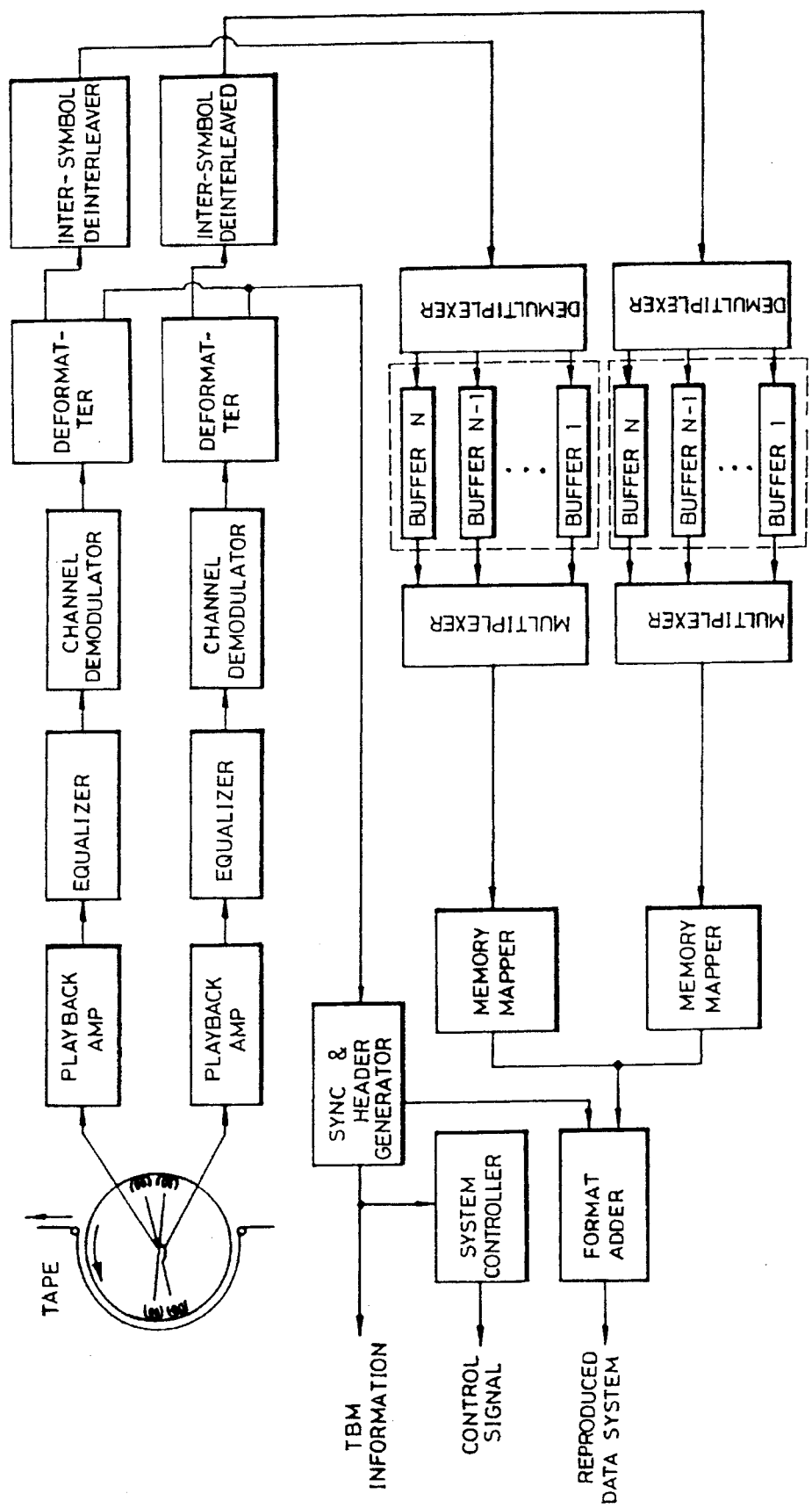
FIG. 14 is a block diagram of still another embodiment of the deinterleaving apparatus according to the present invention.
Figure 15:
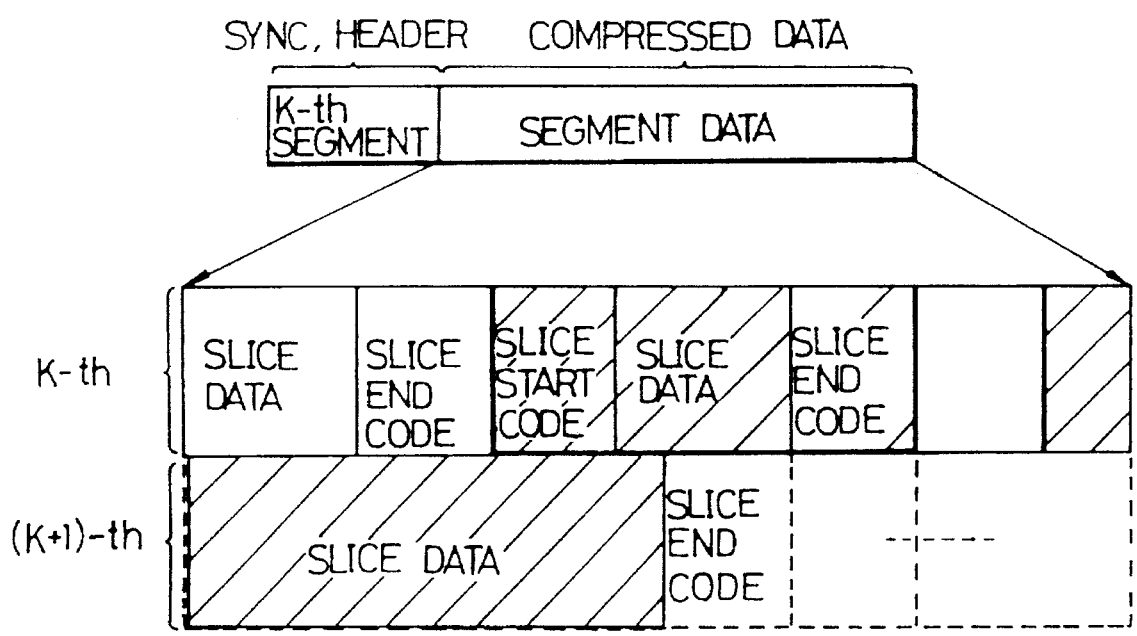
FIG. 15 is a view explaining the structure of a slice existing in the compressed data.

In addition, the deinterleaving apparatus corresponding to the interleaving apparatus is as shown in FIG. 14 and the construction and operation thereof are simply the reverse of the interleaving apparatus and thus will be omitted.

Figure 17A:
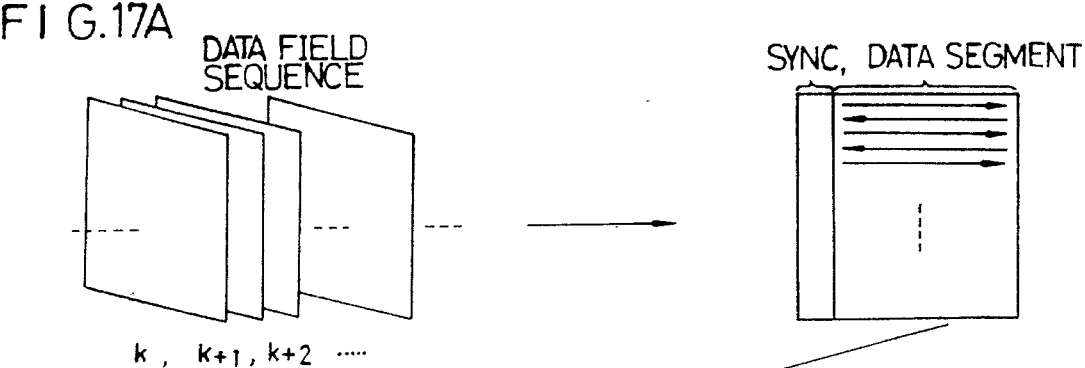
FIGS. 17A to 17E are views explaining a data formatting process in data recording/reproduction in accordance with the present invention.
Figure 17B:

Format divider 101 divides an input compressed data stream into a synchronizing signal and compressed data and performs formatting as shown in FIG. 18 and thus arranges the compressed data successively per line (i.e., 1 segment). The data of the divided synchronizing signal and data are successively written in memory mapper 102 in zigzag form in the unit of segment as shown in FIG. 17A.

Figure 17C:
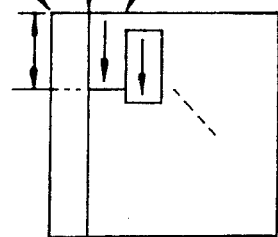

Demultiplexer 104 performs demultiplexing with respect to the data stored in memory mapper 102 so as to divide one segment into N blocks as shown in FIG. 7B and writes respective segments for each block to buffer section 105 including N buffers. That is, one segment is written to buffer 1 and the next segment is being shifted for one vertical size so as to be written to buffer 2 as shown in FIG. 17C.

Figure 17D:
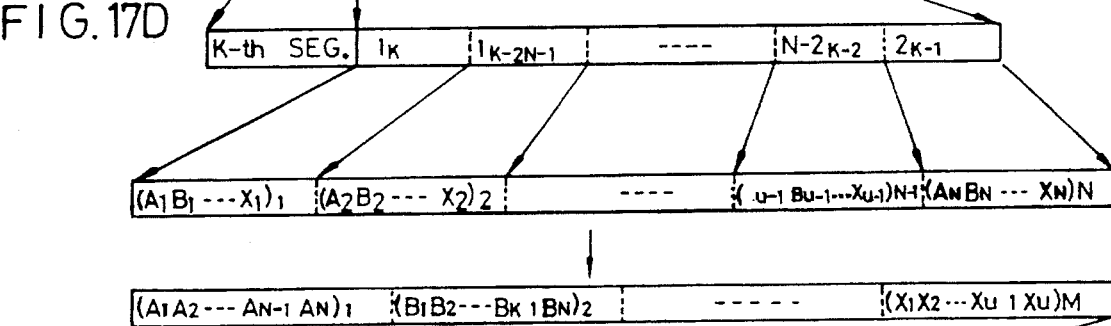
Figure 19A:
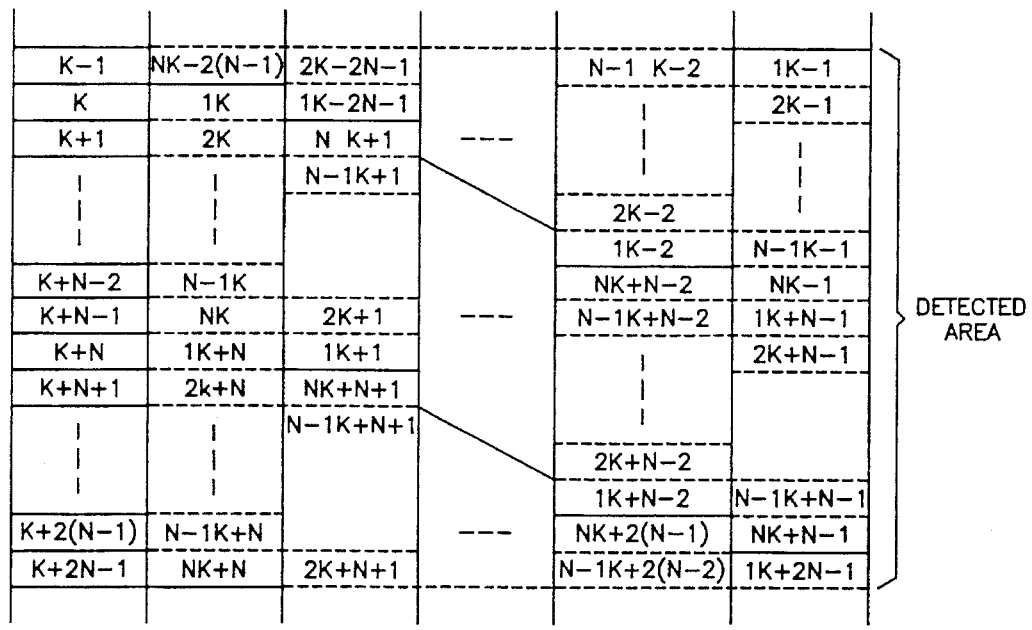
FIGS. 19A and 19B show the data formats arranged in interleaving and deinterleaving according to the present invention.
Figure 20A:
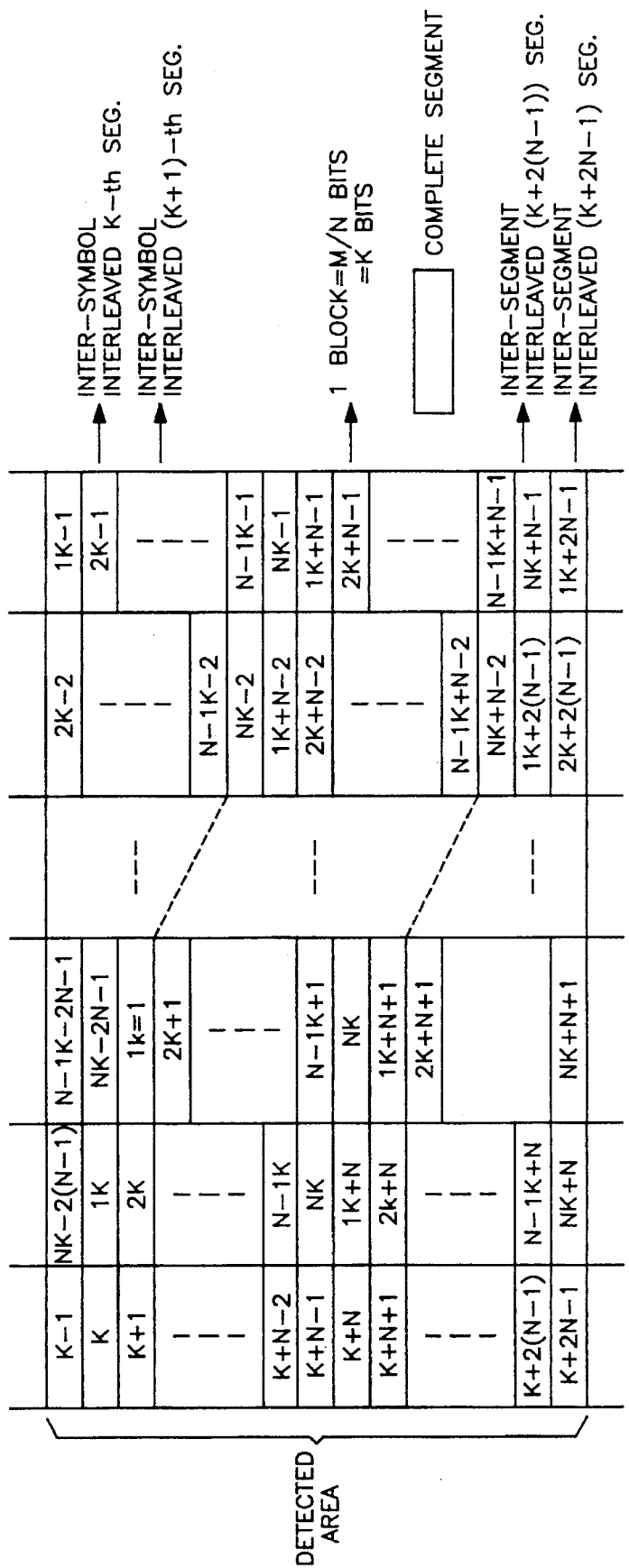
FIGS. 20A and 20B show the data formats rearranged in interleaving and deinterleaving according to the conventional apparatus.

Multiplexer 106 performs multiplexing with respect to the vertically written data and then transmits to inter-symbol interleaver 108 symbols for blocks in the respective segments. Inter-symbol interleaver 108 performs interleaving to form n blocks by grouping the data in the same position as shown in FIG. 17D, i.e., classifies the data in accordance with line. The interleaving process to classify the data is as shown in FIG. 19A, while the conventional process is as shown in FIG. 20A.

Figure 17E:
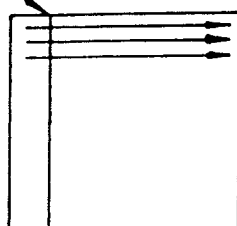

Thus, from synchronizing and header signal generator 110, formatter 111 receives a synchronizing signal divided from format divider 101 and a header signal corresponding to the synchronizing signal under the control of system controller 109 and performs formatting with respect to the received data along with the data from inter-symbol interleaver 108 as shown in FIG. 17E, so as to provide the formatted data to channel modulator 112. Channel modulator 112 performs channel modulation with respect to the provided data. The modulated data enter recording amplifiers 113 to be amplified and then are recorded on the tape.

Figure 19B:
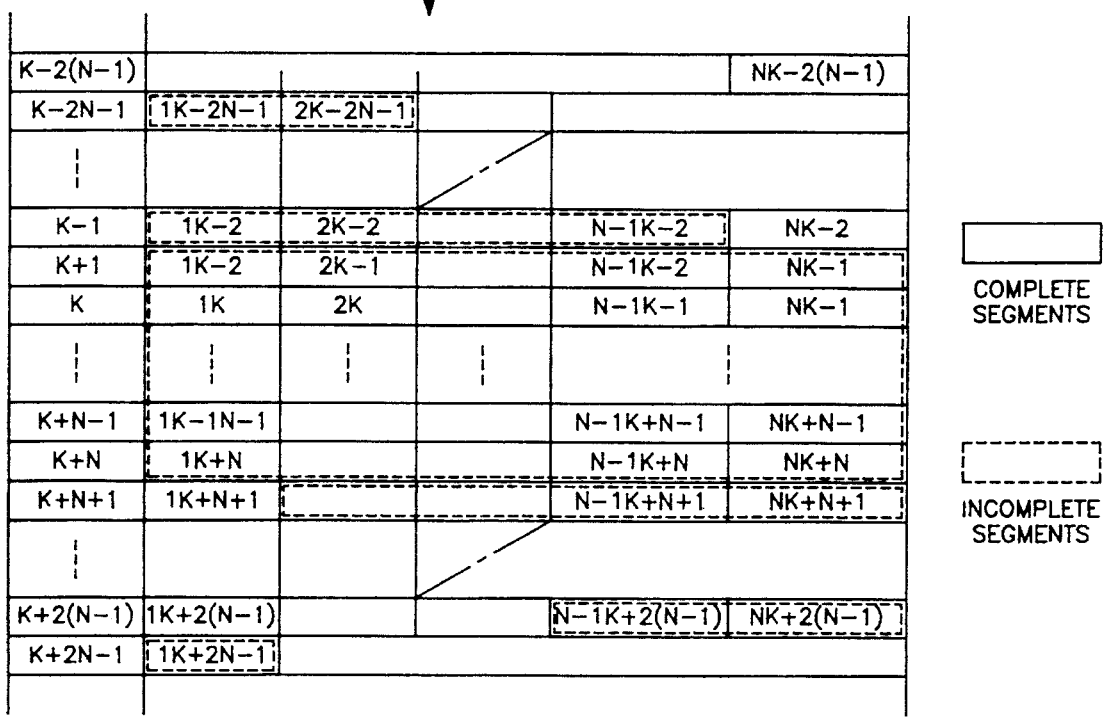
Figure 20B:
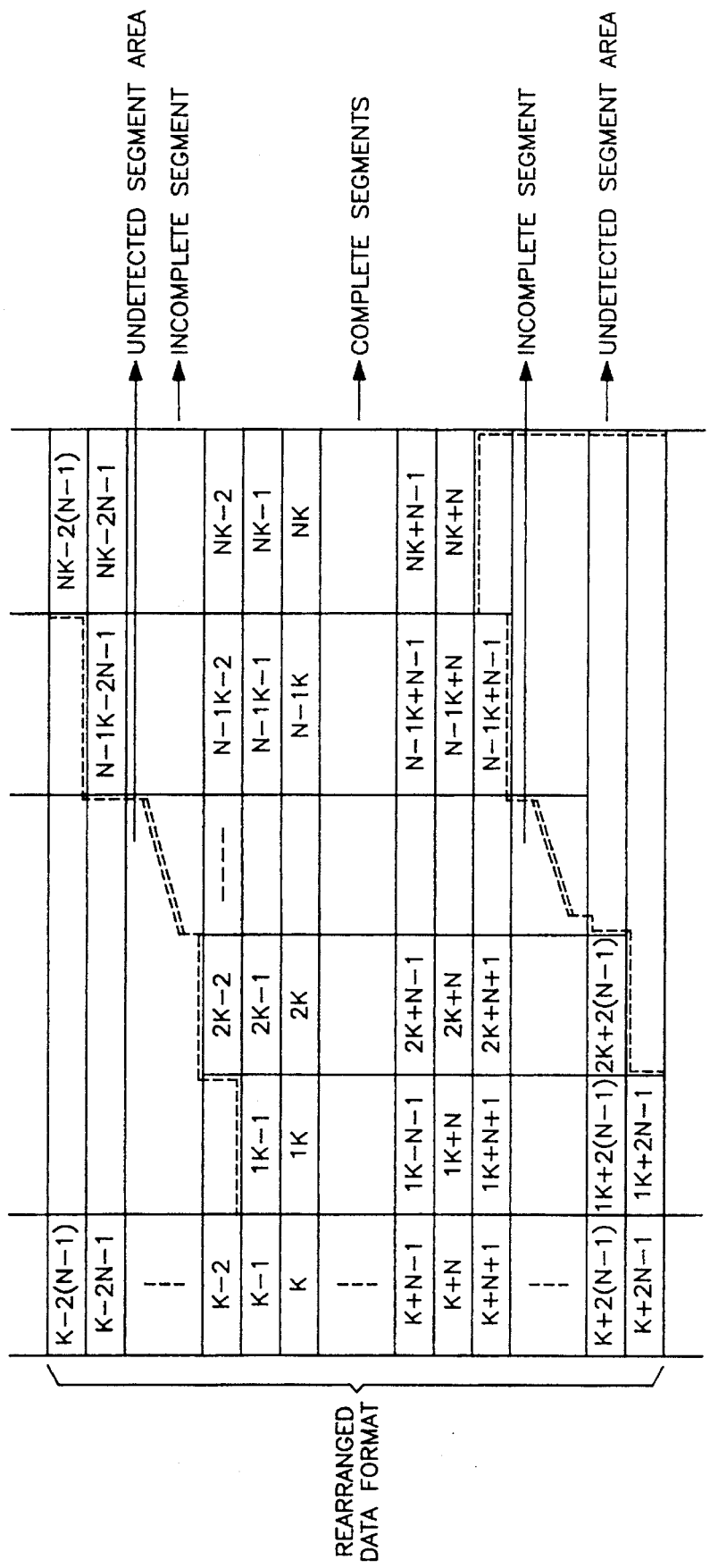

In the conventional method, after the deinterleaving process is completed by performing interleaving in opposite by way of the apparatus of FIG. 14, the incomplete segment should be removed as shown in FIG. 20B. However, according to the present invention, as shown in FIG. 19B, the incomplete segment becomes longer and the orders of data between neighboring segments are changed, thereby connecting the blocks between incomplete segments and increasing the probability of including a slice lying in two segments. Accordingly, the slices extracted from segments can be detected still better, thereby improving the picture quality.

Figure 21:
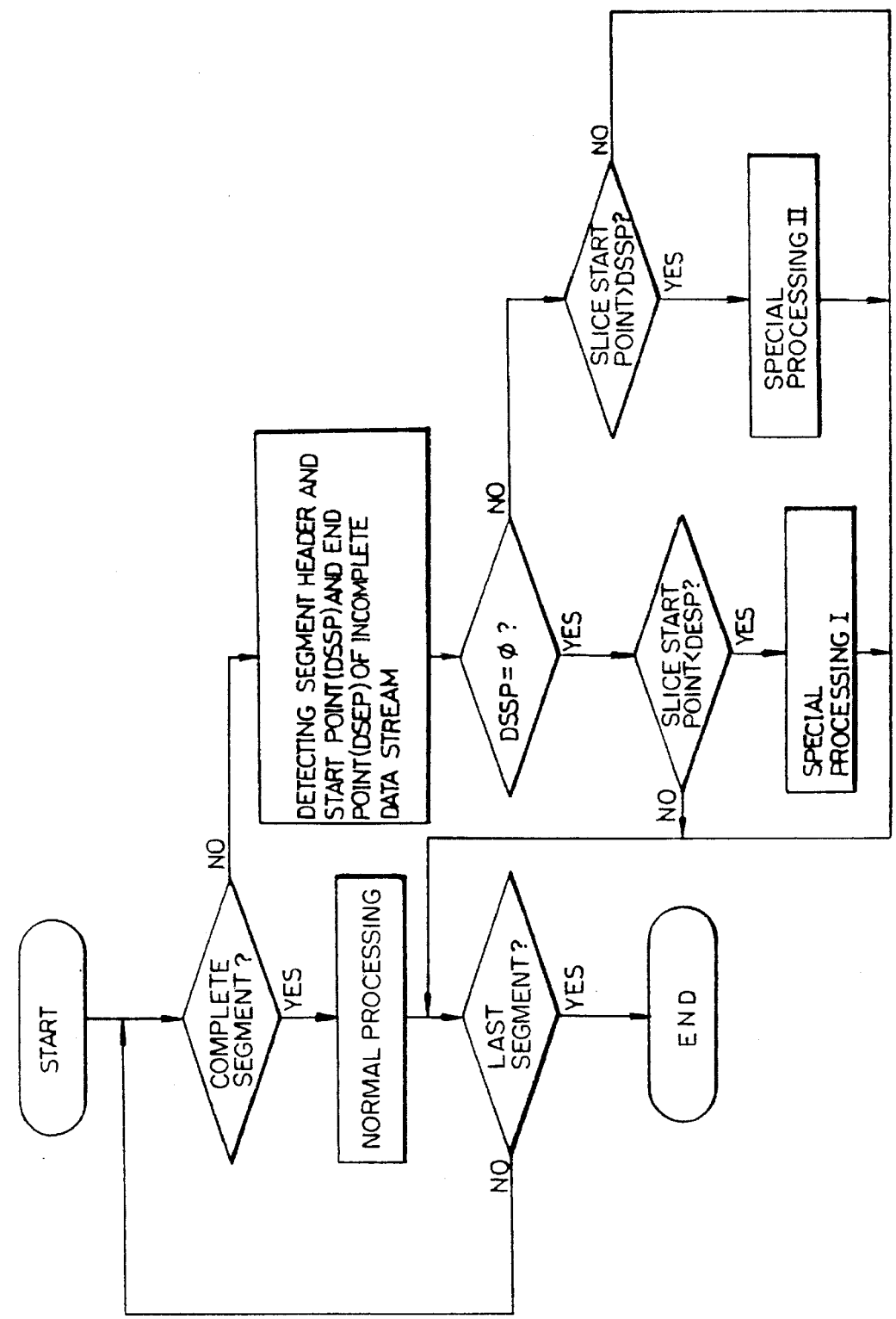
FIG. 21 is an algorithm diagram incorporating the interleaving/deinterleaving method according to the present invention.

The process of extracting slices from incomplete segments to make them useful will be explained with reference to FIG. 21.

First, after interleaving/deinterleaving is performed, it is detected whether a recorded/reproduced data segment is complete or incomplete. If the detected data segment is complete, normal data processing is performed with respect to the complete data segment and ends up when the last data segment is processed. If the detected data segment is incomplete, a segment header signal and the end point DSEP and the start point DSSP of the incomplete data are detected.

If the start point of the data stream does not exist, the size of the start point of a slice a is compared with that of the end point of the data stream. At this point, if the start point of the slice has a smaller size, a suitable process is performed and ends up when the last segment data is processed. If the size of the start point of the slice is not smaller, it is detected whether the data segment is the last one and the process ends up at that point, which means that no slice is taken.

Meanwhile, if the start point of the incomplete data stream exists, the size of the start point of the slice is compared with that of the data stream. At this time, if the size of the start point of the slice is bigger, a corresponding process is performed until the last data segment is processed. When the last data segment comes out, the process ends up and the start point of the slice which is not bigger will be removed. As a result, the slice extracted from the incomplete data segment can be used for improved picture quality.

From the foregoing, it will be apparent that according to the present invention, an interleaving/deinterleaving is performed within an interleaving region which is restricted in accordance with a predetermined maximum speed in variable speed play, so that error correction capability is improved though the VCR head may have a nonlinear trace. Error correction capability may also be improved when the error decoding array has insufficient data in high speed play. Furthermore, many slices can enter an incomplete data segment easily, thereby providing picture quality of high resolution.

Whereas the present invention has been described in particular relation to the drawings attached hereto, it should be understood that other and further modifications, apart from those shown or suggested herein, may be made with in the spirit and scope of this invention.

We claim:

1. An interleaving/deinterleaving apparatus for a digital video cassette recorder comprising:

a format divider for dividing an input compressed data stream into a synchronizing signal and data and formatting the synchronizing signal and data after division thereof;

a memory mapper for reading out and storing in zigzag form data segments of said data after division;

a demultiplexer for demultiplexing said data segments provided from said memory mapper and temporarily storing said data segments in a plurality of buffers;

a multiplexer for multiplexing said data segments from said buffers and providing multiplexed data;

an inter-symbol interleaver for performing inter-symbol interleaving with respect to said multiplexed data provided from said multiplexer;

a synchronizing and header signal generator for receiving said synchronizing signal from said format divider and providing a header signal corresponding to said synchronizing signal along with said synchronizing signal;

a system controller for controlling said format divider and said synchronizing and header signal generator in accordance with an input transmitted bitstream map (TBM) signal;

a formatter for formatting said synchronizing and said header signals from said synchronizing and header signal generator and symbol data from said inter-symbol interleaver; and a channel modulator for modulating formatted data from said formatter and providing modulated data as a tape recording signal.

2. An interleaving/deinterleaving apparatus as claimed in claim 1, further comprising:

an outer coder, connected between said memory mapper and said demultiplexer, for performing outer coding with respect to said data segments from said memory mapper and adding an outer code thereto; and an inner coder, connected between said multiplexer and said inter-symbol interleaver, for coding said multiplexed data from said multiplexer and adding an inner code thereto.

3. An interleaving/deinterleaving apparatus as claimed in claim 1, wherein said format divider selects said data per symbol or per block and divides selected data into a plurality of data channels.

4. An interleaving/deinterleaving apparatus as claimed in claim 1, wherein said format divider scans said data per line in zigzag form and divides scanned data into a plurality of data channels.

5. An interleaving/deinterleaving apparatus as claimed in claim 1, wherein said demultiplexer performs line-shifting with respect to said data segments so that said each data segment has a delay time different from one another and storing shifted one of said data segments in said plurality of buffers, whereby an interleaving effect is not degraded in variable speed play.

6. An interleaving/deinterleaving method for a digital video cassette recorder comprising the steps of:

dividing an input compressed data steam into a synchronizing signal and data and formatting the data into units of data segments;

reading said data segments in zigzag form and storing read data segments in a memory mapper;

dividing each of the data segments stored in the memory mapper into n segment blocks and successively and vertically writing the segment blocks in a data field with shifting of each of the segment blocks for one vertical size of the data segment; and performing inter-symbol interleaving with respect to data symbols in the segment blocks by classifying the data symbols and sectioning classified data symbols in line.

7. An interleaving/deinterleaving method as claimed in claim 6, wherein the formatting step includes a substep of dividing the data segments into a plurality of data channels.

8. An interleaving/deinterleaving method as claimed in claim 6, wherein each of the data segments is divided into a plurality of blocks at the dividing and shifting step, whereby a small burst error in the data segment is prevented.

* * * * *